United States Patent [19]

Bruttel et al.

[11] 4,425,134
[45] Jan. 10, 1984

[54] PROCESS FOR PRODUCING AGGLOMERATES OF WATER-SOLUBLE DYES

[75] Inventors: Beat Bruttel, Böckten; Hansjörg Schneider, Reinach; Alain Millioud; Michael Rosch, both of Allschwil, all of Switzerland

[73] Assignee: Ciba-Geigy Corporation, Ardsley, N.Y.

[21] Appl. No.: 353,543

[22] Filed: Mar. 1, 1982

Related U.S. Application Data

[63] Continuation of Ser. No. 190,143, Sep. 24, 1980, abandoned.

[30] Foreign Application Priority Data

Oct. 2, 1979 [CH] Switzerland ................. 8885/79

[51] Int. Cl.³ ............... C09B 67/08; C09B 67/10; C09B 67/00
[52] U.S. Cl. .................................. 8/524; 8/526; 8/553; 8/564
[58] Field of Search ............. 8/524, 526, 553, 564

[56] References Cited

U.S. PATENT DOCUMENTS

| | | | |
|---|---|---|---|
| 3,086,831 | 4/1963 | Robbins ........................... | 8/553 |
| 3,658,456 | 4/1972 | Hertel ............................. | 8/524 |
| 3,948,599 | 4/1976 | Irmiger et al. .................. | 8/526 |
| 3,960,486 | 6/1976 | Daubach et al. ................ | 8/524 |
| 4,058,480 | 11/1977 | Lohman et al. ................. | 8/524 |
| 4,134,725 | 1/1974 | Buchel et al. ................... | 8/526 |
| 4,227,880 | 10/1980 | Hohenegger et al. ........... | 8/526 |
| 4,295,851 | 10/1981 | Neumann et al. ............... | 8/648 |

FOREIGN PATENT DOCUMENTS

| | | | |
|---|---|---|---|
| 614354 | 7/1947 | United Kingdom .............. | 8/524 |
| 1368322 | 9/1974 | United Kingdom .............. | 8/524 |
| 1509965 | 5/1978 | United Kingdom . | |
| 1588270 | 4/1981 | United Kingdom . | |
| 1590154 | 5/1981 | United Kingdom . | |

*Primary Examiner*—Maria Parrish Tungol
*Attorney, Agent, or Firm*—Edward McC. Roberts

[57] ABSTRACT

A process for producing agglomerates of water-soluble dyes by adding a granulating auxiliary to at least one water-soluble dye, which is in pulverulent form, and converting the mixture, whilst it is being subjected to a tumbling and/or mixing action, by particle enlargement into a granular form, in which process there is used as a granulating auxiliary:

(a) at least one compound of the formula I $$A-(CH_2CH_2O)_n-H \quad \text{(I)}$$

in which A is the group R—O— or

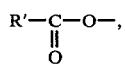

R is an aliphatic or alicyclic hydrocarbon radical containing 8 to 22 carbon atoms, R' is an aliphatic hydrocarbon radical containing 8 to 22 carbon atoms, and n is 10 to 200, or (b) a mixture of a compound of the formula II

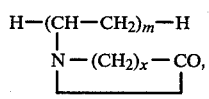

in which m is 50 to 500, and x is 3 to 5, with a compound of the formula III $$R_1-NH-CO-NH-R_1 \quad \text{(III)}$$

in which each $R_1$ independently of the other is hydrogen or methyl, or (c) a mixture of a compound of the formula I with at least one compound of the formula II or III, and the granulating auxiliary or auxiliary mixture is heated to above its softening point or softening range, the granulating auxiliary or auxiliary mixture having a softening point or softening range of between 30° and 150° C., and being used in amounts of 5 to 50 percent by weight, relative to the dye.

21 Claims, No Drawings

PROCESS FOR PRODUCING AGGLOMERATES OF WATER-SOLUBLE DYES

This is a continuation of application Ser. No. 190,143 filed on Sept. 24, 1980, now abandoned.

The invention relates to a process for producing agglomerates of water-soluble dyes, as well as to the agglomerates, as an industrial product, obtained by this process.

A process is described in the German Offenlegungsschrift No. 2,616,936 for producing agglomerates of dyes or of optical brighteners by the use of a specific adhesive which softens or melts between 50° and 150° C. It is not however possible to obtain by this process agglomerates which satisfy practical requirements.

The granulation of pulverulent solids by particle-size enlargement, so-called build-up granulation, is known for example from the article of H. B. Ries, "Aufbereitungs-Technik" (Preparation techniques) No. 11/1971, p. 675. In the case of build-up granulation of pulverulent dyes, such as are obtained after grinding and mixing processes or by means of spray drying, the bulk density of the initial product is usually not again achieved, especially with the spray-dried products.

The object of the present invention therefore is to obtain agglomerates which as near as possible have a bulk density which is at least approximately as high as that of the initial product, and which are equal in every other respect to the current commercial forms.

It has been found that it is possible according to the present invention to obtain agglomerates which satisfy the said requirements, the bulk density of spray-dried products being even improved. The compact agglomerates obtained according to the present invention surprisingly have in particular a good solubility in all respects, including solubility in cold water, and their wetting and suspension properties are excellent. The additives used according to the invention have at the same time other advantages: they improve the solubility or rate of dissolving of the granulates, and lead moreover to a good binding of dust and to good mechanical stability, properties which are very desirable in commercial forms of granulates. The agglomerates (granulates) are readily dispersible, give stable dispersions and result in level dyeings.

The invention thus relates to a process for producing agglomerates of water-soluble dyes by adding a granulating auxiliary to at least one water-soluble dye, which is in pulverulent form, and converting the mixture, whilst it is being subjected to a tumbling and/or mixing action, by particle enlargement into a granular form, in which process there is used as a granulating auxiliary:

(a) at least one compound of the formula I $$A-(CH_2CH_2O)_n-H \qquad (I)$$

in which A is the group R—O— or

R is an aliphatic or alicyclic hydrocarbon radical containing 8 to 22 carbon atoms, R' is an aliphatic hydrocarbon radical containing 8 to 22 carbon atoms, and n is 10 to 200, preferably 20 to 150, or (b) a mixture of a compound of the formula II

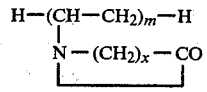

in which m is 50 to 500, and x is 3 to 5, with a compound of the formula III $$R_1-NH-CO-NH-R_1 \qquad (III)$$

in which each $R_1$ independently of the other is hydrogen or methyl, or (c) a mixture of a compound of the formula I with at least one compound of the formula II or III; and the auxiliary or auxiliary mixture is heated to above its softening point or softening range, the auxiliary or auxiliary mixture having a softening point or softening range between 30° and 150° C., preferably between 40° and 100° C., and being used in amounts of 5 to 50, preferably 10 to 30, percent by weight, relative to the dye.

In addition to these granulating auxiliaries, there can be present further additives, such as in particular diluting agents, in amounts of 0.1 to 50 percent by weight, relative to the dye to be granulated, for example sodium chloride or sodium sulfate; and also wetting agents, dispersing agents and anti-dust agents.

The dye granulates obtained by the process according to the invention likewise form subject matter of the invention.

Suitable water-soluble dyes are for example: acid and basic dyes, such as metal-complex dyes, chrome dyes, developing dyes and mordant dyes, and especially reactive dyes. They are in particular sulfo group- or carboxylic group-containing metal-free or metal-containing and metallisable mono-, dis- and polyazo dyes, formazan dyes, anthraquinone, nitro, methine, acid triphenylmethane, xanthone, naphthazarine, quinophthalone and phthalocyanine dyes; as well as preferably dyes of this kind which contain at least one fibre-reactive group in the dye molecule, such as in particular heterocyclic groups or an acyl group of a carboxylic acid, these groups having at least one halogen atom which can be split off under dyeing conditions.

Suitable water-soluble metal-complex dyes are sulfo group- or carboxylic group-containing metal-complex dyes, for example 1:1- or 1:2-metal complexes of azo or azo-methine dyes, or metallised phthalocyanines, especially copper and nickel phthalocyanines. The 1:1- and 1:2-metal complexes are preferably 1:1-nickel complexes, 1:1-cobalt complexes, 1:1-copper complexes, 1:1-chromium complexes or 1:1-iron complexes, or symmetrical or asymmetrical 1:2-cobalt complexes, 1:2-iron complexes or 1:2-chromium complexes of in particular o-carboxy-o'-hydroxy-, o-hydroxy-o'-amino- or o,o'-dihydroxyazo dyes of the benzene-azo-benzene-, naphthalene-azo-naphthalene-, benzene-azo-naphthalene-, benzene-azo-pyrazolone-, benzene-azo-pyridone- or benzene-azo-acetic acid amide type, wherein these groupings can be unsubstituted or substituted. Suitable substituents are for example: unsubstituted or substituted sulfonic acid amides or sulfones, halogen or nitro.

The copper and nickel phthalocyanines used according to the invention are derived from the customary mixtures of different sulfonation grades, and preferably contain 2 to 3 or also 4 sulfated sulfonic acid-β- or -γ-hydroxyalkylamide groups; they can in addition however also contain individual halogens and individual sulfonic acid amide groups, these sulfonic acid amide groups being unsubstituted or substituted on the nitrogen atom, for example by lower alkyl, such as methyl, ethyl, propyl or butyl, or by lower hydroxyalkyl groups, such as 2-hydroxyethyl, 2-hydroxypropyl or 3-hydroxypropyl.

In the present process, the azo dyes containing sulfonic acid groups are preferably used in the form of their metal salts, for example potassium or in particular sodium salts. They are preferably water-soluble reactive dyes, especially reactive acid azo or anthraquinone dyes.

Suitable fibre-reactive groups are for example heterocyclic groups or an acyl group of a carboxylic acid, these groups having at least one halogen atom which can be split off. They are for example the following groups: s-triazinyl groups which carry on the triazine ring one or two halogen atoms, such as chlorine, fluorine or bromine atoms; pyrimidyl groups which carry one to three halogen atoms, such as chlorine and/or fluorine atoms, or one or two arylsulfonyl or alkanesulfonyl groups on the pyrimidine ring; dichloroquinoxylinyl-, 2-chlorobenzothiazolyl or chloroacetylamino groups or α,β-dibromopropionylamino groups.

Further suitable fibre-reactive groups are for example: halocyclobutane-, mono- or bis-(γ-halogeno-β-hydroxypropyl)amino groups, β-halogenoethylsulfamide groups, β-halogenoethoxy groups, β-halogenoethylmercapto groups, γ-halogeno-β-hydroxy-propyl-sulfamide groups, or 2,3-epoxypropyl groups.

The dyes can be optionally also in admixture with each other or optionally with dyes of another type.

The dyes usable according to the invention are known, and can be produced by methods known per se.

Aliphatic hydrocarbon radicals R and R' of the granulating auxiliaries of the formula I are saturated or unsaturated, straight-chain or branched-chain hydrocarbon radicals which are derived from aliphatic alcohols and acids having 8 to 22, preferably 8 to 20, carbon atoms.

Alicyclic hydrocarbon radicals R are in particular polycyclic radicals of alicyclic alcohols, such as hydroabietyl alcohol.

Compounds of the formula I in which A is the group R—O— are reaction products from 10 to 200, preferably 20 to 150 mols of ethylene oxide with higher alcohols having 8 to 22 carbon atoms, such as decyl, lauryl, tridecyl, myristyl, cetyl, stearyl, oleyl, arachidyl or behenyl alcohol; especially reaction products from 35 to 80 mols of ethylene oxide with higher alcohols, for example straight-chain, saturated or unsaturated alcohols having 18 carbon atoms, such as the reaction product from oleyl alcohol and 80 mols of ethylene oxide, or from stearyl alcohol and 35 mols of ethylene oxide; also reaction products from alicyclic alcohols with 80 to 120 mols of ethylene oxide, such as hydroabietyl alcohol etherified with 100 mols of ethylene oxide.

Compounds of the formula I in which A is the group

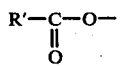

are reaction products from 10 to 200 mols, preferably 20 to 150 mols, of ethylene oxide with straight-chain aliphatic acids, such as fatty acids, for example caprylic, capric, lauric, myristic, palmitic, stearic, arachic, behenic, coconut oil-($C_8$–$C_{18}$), decenic, dodecenic, tetradecenic, hexadecenic, oleic, linoleic, linolenic, ricinoleic, eikosenic, dokosenic or clupanodenic acid; particularly the condensation product from oleic acid and 20 mols of ethylene oxide.

Compounds of the formula II are in particular polyvinylcaprolactam or preferably polyvinylpyrrolidone having a molecular weight of up to about 40,000, and compounds of the formula III are urea and N,N'-dimethylurea.

As granulating auxiliaries usable according to the invention, there are advantageously used compounds of the formula I on their own or in admixture with a different compound of the formula I, or with a compound of the formula II or III, or a mixture of a compound of the formula II with a compound of the formula III. These mixtures are of particular interest when they are eutectic mixtures, the softening point or the softening range of the mixtures being between 30° and 150° C., preferably between 40° and 100° C.

An auxiliary mixture usable according to the invention is for example a mixture of a compound of the formula I wherein A is the group

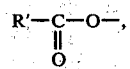

R' is an unsaturated, straight-chain aliphatic hydrocarbon radical containing 8 to 22 carbon atoms, and n is 10 to 30, with urea, optionally in admixture with additives lowering the melting point; in particular a mixture of a condensation product from oleic acid with 20 mols of ethylene oxide with urea, optionally in admixture with additives lowering the melting point; or a mixture of a compound of the formula II, wherein x is 3, and m has the meaning given hereinbefore, with urea, optionally in admixture with additives lowering the melting point.

The dyes to be granulated have to be in dry form, for example as crude material, as spray-dried material, or as material dried in a conventional manner, for example as powder dried in a grinding dryer.

It is furthermore advantageous when the particle size of all components is within a narrow range (for example 30 to 150 μm), in order to thus ensure a uniform grain build-up.

The granulating auxiliary can be added in solid form to the dye power, the temperature being subsequently raised, as the auxiliary and dye and being intermixed, to above the softening point of the granulating auxiliary; or the dye is heated before addition of the granulating auxiliary to a temperature at which the granulating auxiliary softens after addition. It is also possible however to add the melted granulating auxiliary to the optionally heated dye, preferably by spraying or by injection through a nozzle.

The preferred process for particle enlargement consists for example of the following operations:
 preparation of the homogeneous mixture which can be granulated and which comprises dye, granulating auxiliary and optionally further additives;
 heating of this mixture, whilst it is being subjected to a mixing or tumbling movement, at at least 40° C., preferably at 50° to 95° C., for about 5 to 30 minutes;
 crushing of lumps occurring; and
 cooling of the agglomerates with aggitation to about 40°–50° C.

The agglomerate size can be varied, depending on the amount of granulating auxiliary, within the range of 90 μm to 20 mm.

There are employed for carrying out the process according to the invention advantageously the known customary continuous and discontinuous granulating machines, for example granulating drum, pan granulator, such as the EIRICH pan granulator, and dryer, for example a Conaform dryer or eccentric tumbling dryer.

Suitable sources of heat are radiation heating, such as microwave radiation or in particular IR radiation, or convection heating, such as jacket heating or stirring-shaft heating.

The process according to the invention is advantageously performed at a temperature which is at least sufficiently high that the granulating auxiliary commences to soften, advantageously however at a temperature about 5°–30° C. above this point. During heating and up to completion of granulate formation, there has to be maintained a gentle rotary motion at a peripheral speed of 0.3–2.2 m/sec., preferably 0.5–2.0 m/sec.

It is thus possible by means of this process to convert water-soluble dyes, particularly when in powder form, having an initial fineness of about 1 to 150 μm into a granular non-dusty form having a particle size of about 100 μm to 20 mm, the residual moisture content thereof being about 2 to 10 percent by weight.

There are advantageously used 5–50 parts, preferably 10–30 parts, of the granulating auxiliary to 100 parts of the crude dye to be granulated. The particle size of the granulating auxiliary has to be between 0.1 and 0.5 mm. With a smaller particle size, no agglomerates are formed and with a larger particle size, inhomogeneous agglomerates having a poor yield of good particles is obtained. By yield of good particles is meant that proportion of the resulting agglomerates which have a particle size of between 0.2 and 2 mm.

Schüll LS14) is secured at the 400 cm$^3$ level of the cylinder, the filter paper being moistened with water to the extent that it is moderately moist but not dripping wet. 10 g of the substance to be tested are then poured quickly through the funnel; the funnel is removed after 3 minutes, and the circular filter paper is taken out by cutting. This filter paper is then assessed on the basis of a scale of ratings from 1 to 5 as follows:

rating 1 = severe release of dust, when the circular filter paper is heavily shaded to deeply coloured;

rating 2 = considerable release of dust, when the circular filter paper is slightly shaded;

rating 3 = moderate release of dust, when the circular filter paper exhibits many specks of colour, some of which are in contact with each other;

rating 4 = slight release of dust, when the circular filter paper exhibits spots of colour, none of which are connected with each other;

rating 5 = negligible release of dust, when the circular filter paper exhibits a scarcely visible staining or at most scattered spots of colour.

The following test is carried out to determine the solubility of the dye agglomerates in cold water:

A specific amount (in g) of the dye agglomerates to be tested is added with stirring to 200 ml of desalted water at 20° C. in a 400 ml beaker, and stirring is maintained for 5 minutes (magnetic stirrer at 750 r.p.m.). The dye solution is then filtered through a filter paper (SS 1450 CV, diameter 7 cm), and the paper is rinsed with 50 ml of desalted water.

The solubility in cold water is expressed as being the highest concentration of dye in water which leaves no filter residue.

EXAMPLE 1

Dry dye, which has been spray-dried, of the formula

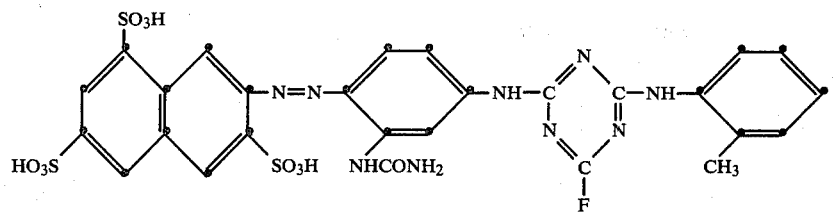

The dye agglomerates of the invention are abrasion-proof, free flowing, non-dusty and of high bulk density, and in particular they are readily and quickly soluble in cold water. They are especially suitable for producing aqueous dye liquors and printing pastes, which can be used for dyeing and printing the widest variety of materials suitable for the respective class of dyes.

In the following Examples illustrating the invention, the term 'parts' denotes parts by weight, and temperature values are given in degrees Centigrade. The dyes are in the form of an alkali metal salt, particularly the sodium salt. With regard to the preparations, the term low dust signifies that virtually no particles less than 50 μm in size are present.

The following dust test is carried out to determine the behaviour with regard to release of dust:

A metal funnel having an internal diameter of 10 cm with a tube (internal diameter 15 mm) is placed onto a metal cylinder of 500 cm$^3$ capacity, the lower end of the tube extending down to the 200 cm$^3$ level of the cylinder. A pierced circular filter paper (Schleicher and (particle size 10 to 50 μm) is homogenised, for about 10 minutes in a mixer (for example of the Lödige type), with 15 percent by weight, relative to the granulate, of a reaction product in the form of fine flakes (softening point about 45°), which is formed from commercial hydroabietyl alcohol (a mixture of about 45% of tetrahydroabietyl alcohol, 40% of dihydroabietyl alcohol and 15% of dehydroabietyl alcohol) etherified with 100 mols of ethylene oxide, and the mixture is subsequently heated within 30 minutes to 80°. After reaching this temperature, the mixture is cooled to room temperature whilst the mixer is still operating.

There is obtained a non-dusty dye granulate, which can be removed without difficulty from the mixer, and which if necessary can still be sifted in order to separate any minute proportion of dust present.

The granulate surprisingly has a high bulk density (at least 700 g/l), and has good solubility in cold water. The reactive dye receives a mild treatment in the course of the process and fully retains its reactivity. The dust test of the unsifted granulate gives a dust value of 4–5 on the scale of 1 to 5, 5 being the best rating.

Composition of the granulate 79.5% of crude dye,
15% of granulating auxiliary, and about
5.5% of residual moisture.

Granulate data bulk density: >700 g/l (starting material/crude dye 550 g/l)
dust rating: 4–5
solubility in hot water (60° C.): 100 g/l (starting material/crude dye 80 g/l)
solubility in cold water (20° C.): about 50 g/l
particle-size distribution
<250 μm: 3.4%
250–2000 μm: 92.6%
>2000 μm: 4.0%
dyeing (by the customary exhaust process):
shade: good; purity: good; colouring strength: good.

EXAMPLE 2

Dry dye, which has been dried in a grinding dryer, of the formula given in Example 1 is further processed, in a Lödige mixer as in Example 1, with about 12.5%, relative to the granulate, of a reaction product formed from oleyl alcohol with 80 mols of ethylene oxide (softening point about 50°). There is obtained a dye granulate having a mean particle size of 850 μm, a bulk density of over 700 g/l, and a solubility in cold water (20°) of 50 g/l.

EXAMPLE 3

Dry dye, which has been dried in a grinding dryer, of the formula given in Example 1 is processed, in a Lödige mixer as in Example 1, with about 17.5%, relative to the granulate, of the reaction product given in Example 1. The dye granulate obtained has a mean particle size of about 1200 μm, has a very low dust content (dust rating 5), a solubility in cold water of 50 g/l and a bulk density of over 800 g/l.

EXAMPLE 4

When the dye given in Example 1 is replaced by the dye of the formula

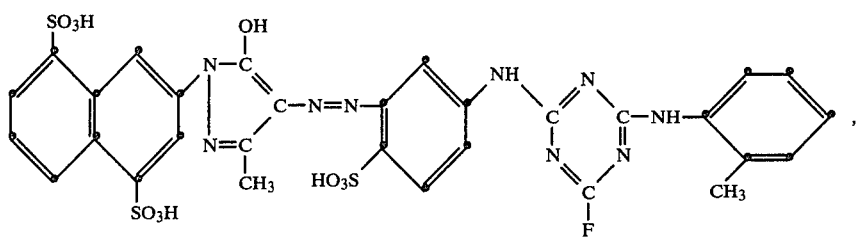

which has been dried in a grinding dryer, the procedure otherwise being as described in Example 1, there is obtained a non-dusty dye granulate (dust rating 4) which has a mean article size of about 620 μm and a very high bulk density (over 900 g/l).

Composition of the granulate

80% of crude dye,
15% of granulating auxiliary, and
5% of residual moisture.

EXAMPLE 5

When the dried dye given in Example 2 is replaced by the dye of the formula

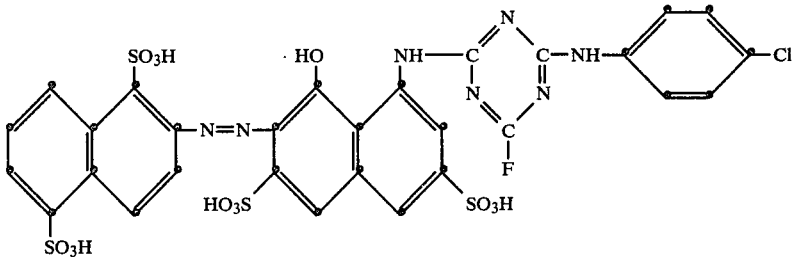

and about 20%, relative to the granulate, of the granulating auxiliary given therein is used, the procedure otherwise being carried out as in Example 2, the dye granulate obtained has a mean particle size of about 220 μm and a very high bulk density (over 800 g/l).

EXAMPLE 6

When the dried dye given in Example 4 is replaced by the dye of the formula

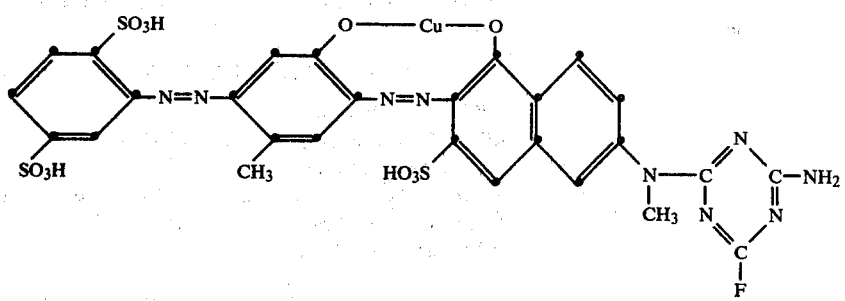

and about 20%, relative to the granulate, of the granulating auxiliary given therein is used, the procedure otherwise being carried out as described in Example 4, the resulting dye granulate has a mean particle size of 350 μm and a very high bulk density (over 800 g/l).

EXAMPLE 7

When the dried dye given in Example 2 is replaced by the dye of the formula

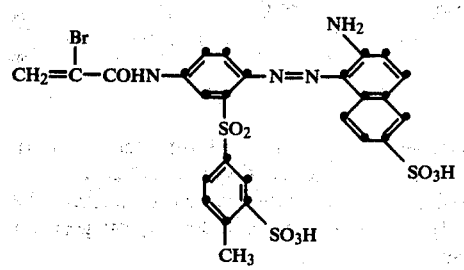

the procedure otherwise being carried out as in Example 2, the result is a dye granulate having a mean particle size of 280 μm and a very high bulk density (over 800 g/l).

EXAMPLE 8

When the dried dye given in Example 3 is replaced by the dye given in Example 7, the procedure otherwise being carried out as in Example 3, the dye granulate obtained has a mean particle size of about 500 μm and a very high bulk density (over 800 g/l).

EXAMPLE 9

The filter press cake of the dye of the formula

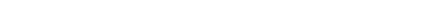

is mixed with an aqueous solution of about 10% of dextrin, relative to the dye, and the mixture is dried, in a mixing dryer, to give a powder having a bulk density of 650 g/l and a mean particle size of 200 μm. The dye powder thus obtained is then granulated with about 24%, calculated relative to the amount of dye, of the granulating auxiliary given in Example 1 in the manner described therein. The result is a dye granulate of the following composition:

75% of crude dye+residual moisture,
7% of dextrin, and
18% of grinding auxiliary.

Granulate data bulk density: 650 g/l
dust rating: 4–5
solubility in hot water (60°): 80 g/l
solubility in cold water (20°): about 30 g/l
particle-size distribution:
<250 μm: 2%
250–2000 μm: 94.3%
>2000 μm: 3.7%.

EXAMPLE 10

When the dye given in Example 9 is replaced by the dye of the formula

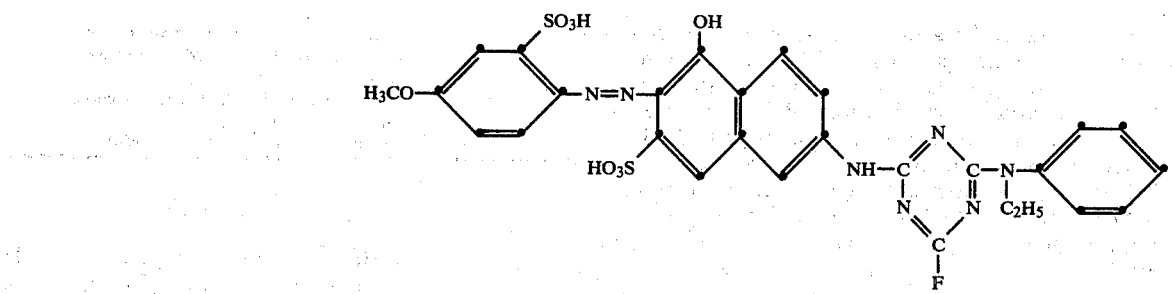

the procedure otherwise being carried out as in Example 9, the resulting dye granulate has the following data:

Composition

75% of crude dye + residual moisture,
7% of dextrin, and
18% of granulating auxiliary.
bulk density: 730 g/l
dust rating: 4
solubility in hot water (60°): 100 g/l
solubility in cold water (20°): 30 g/l
particle-size distribution:
<250 μm: 3%
250–2000 μm: 93.2%
>2000 μm: 3.8%.

EXAMPLE 11

When instead of the dextrin solution there are added in Examples 9 and 10 a naphthalenesulfonic acid formaldehyde condensation product and disodium hydrogen phosphate before drying in the grinding dryer, the procedure otherwise being carried out as in the two Examples, similar dye granulates having the following composition are obtained:

73% of crude dye + residual moisture,
15% of granulating auxiliary,
3% of disodium hydrogen phosphate, and
9% of naphthalenesulfonic acid/formaldehyde condensation product.

EXAMPLE 12

Dry dye, which has been spray-dried, of the formula

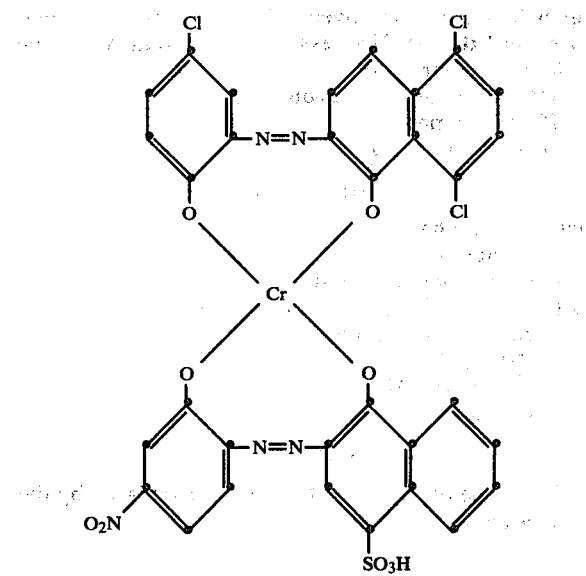

is homogenised, for about 10 minutes in a mixer (for example of the Lödige type), with 6 percent by weight, relative to the granulate, of a reaction product in the form of fine flakes, which is formed from commercial hydroabiethyl alcohol (a mixture of about 45% of tetrahydroabiethyl alcohol, 40% of dihydroabiethyl alcohol and 15% of dehydroabiethyl alcohol) etherified with 100 mols of ethylene oxide, and about 9.5% of a reaction product from oleyl alcohol with 80 mols of ethylene oxide, and the mixture is subsequently heated within 30 minutes to 80°. After attaining this temperature, the mixture is cooled to room temperature whilst the mixer is still operating. The result is a non-dusty dye granulate, which can be removed without difficulty from the mixer, and which if necessary can still be sifted in order to separate any minute proportion of dust present.

COMPOSITION OF THE GRANULATE

79% of crude dye,
6% of hydroabiethyl alcohol, etherified with 100 mols of ethylene oxide,
9.5% of the reaction product from oleyl alcohol and 80 mols of ethylene oxide, and about
5.5% of residual moisture.

Granulate data bulk density: 650 g/l
dust rating: 3–4
solubility in cold water (20° C.): about 30 g/l.

EXAMPLE 13

Dry (spray-dried) 1:2 Co-complex of the dye of the formula

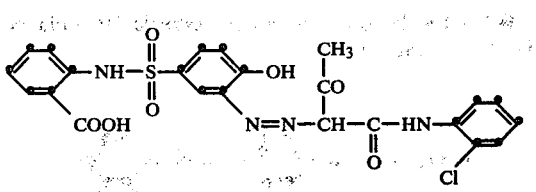

is processed with about 5% of urea, relative to the granulate, and 7% of the reaction product given in Example 2 in a Lödige mixer in the manner described in Example 1. A dye granulate of the following composition is obtained:

82% of crude dye,
5% of urea,
7% of granulating auxiliary, and about
6% of residual moisture.

Granulate data bulk density: 790 g/l
dust rating: 4
solubility in cold water (20°): about 25 g/l.

Equally good granulates having a high bulk density are obtained by using, instead of the auxiliaries given in the above Examples, the granulating auxiliaries listed in the following Table A, the procedure otherwise being the same.

TABLE A

| Example No. | Granulating Auxiliary |
|---|---|
| 14 | condensation product from oleic acid and 20 mols of ethylene oxide |
| 15 | mixture of the condensation product from oleic acid and 20 mols of ethylene oxide and urea, mixture ratio 80:20 |
| 16 | condensation product from stearyl alcohol and 35 mols of ethylene oxide |
| 17 | polyvinylpyrrolidone and urea (20:80) |

EXAMPLES 18 TO 28

Granulates of similar composition and with similar properties are obtained by using, in place of the dyes in the aforementioned Examples, the metal-complex dyes given in the following Tables B to D, the procedure followed being otherwise the same.

In Table B is shown a 1:2-complex dye which contains 2 molecules of the same dye bound in complex linkage with 1 metal atom.

In Table C are listed 1:2-mixed complexes which contain 1 molecule of a dye of column III and 1 molecule of a dye of column IV, bound in complex linkage with 1 metal atom of the column II.

TABLE B

| I Ex. No. | II metal | III dye | IV shade |
|---|---|---|---|
| 18 | Co | [structure: HO-substituted quinoline-N=N-phenyl-SO₃H] | brown |

TABLE C

| I Ex. No. | II Metal | III Dye | IV Dye | V shade |
|---|---|---|---|---|
| 19 | Cr | [structure: O₂N-phenyl(OH)-N=N-naphthol-SO₃H] | [structure: O₂N-phenyl(OH)-N=N-naphthol(OH)] | navy blue |
| 20 | Fe | [structure: O₂N-phenyl(OH)-N=N-pyrazolone with N-phenyl-SO₃H] | [structure: O₂N-phenyl(OH)-N=N-pyrazolone with N-phenyl-SO₂NH₂] | brown |
| 21 | Cr | [structure: HO₃S-naphthol-N=N-naphthol] | [structure: OH-phenyl-N=N-naphthol with OCH₃-phenyl-N=N group] | black |

TABLE C-continued

| I Ex. No. | II Metal | III Dye | IV Dye | V shade |
|---|---|---|---|---|
| 22 | Cr | [structure: hydroxyphenyl-N=CH-hydroxyphenyl with SO₂-NH-phenyl-COOH] | [structure: hydroxy-nitrophenyl-N=N-hydroxynaphthyl] | green |
| 23 | Cr | [structure: HO₃S-hydroxy-naphthyl with N heterocycle] | [structure: hydroxy-nitrophenyl-N=N-aminonaphthyl] | green |

In Table D are listed 1:1-complexes which contain 1 molecule of the dye bound in complex linkage with 1 metal-atom.

TABLE D

| I Ex. No. | II Metal | III Dye | IV Shade |
|---|---|---|---|
| 24 | Fe | [structure: chloro-hydroxyphenyl-N=N-dihydroxyphenyl-N=N-hydroxy-nitro-sulfophenyl] | brown |
| 25 | Cr | [structure: HO₃S-hydroxynaphthyl-N=N-hydroxy-sulfonaphthyl] | blue |
| 26 | Cr | [structure: HO₃S-hydroxy-nitrophenyl-N=N-pyrazolone with CH₃ and phenyl] | orange |

TABLE D-continued

| I Ex. No. | II Metal | III Dye | IV Shade |
|---|---|---|---|
| 27 | Ni | 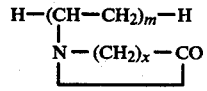 | turquoise blue |
| 28 | Cu |  $n = 1-2$ | turquoise blue |

Pc signifies phthalocyanine

What is claimed is:

1. A process for producing an agglomerate of a water-soluble dye, comprising the steps of adding 5 to 50% by weight, relative to the weight of the dye, of a granulating auxiliary which softens in the range of 30° to 150° C., and mixing the granulating auxiliary with the dye, which is in pulverulent form, by a tumbling movement to effect particle enlargement and produce a granular agglomerate of the dyes while heating the granulating auxiliary sufficiently to soften it during the mixing step, wherein there is used as granulating auxiliary
   (a) at least one compound of the formula I $$A-(CH_2CH_2O)_n-H \quad (I)$$

in which A is the group R—O— or $$R'-\underset{\underset{O}{\|}}{C}-O-,$$

R is an aliphatic or alicyclic hydrocarbon radical containing 8 to 22 carbon atoms, R' is an aliphatic hydrocarbon radical containing 8 to 22 carbon atoms, and n is 10 to 200, or
   (b) a mixture of a compound of the formula II $$\begin{array}{c} H-(CH-CH_2)_m-H \\ | \\ N-(CH_2)_x-CO \\ \underline{\hspace{3cm}} \end{array} \quad (II)$$

in which m is 50 to 500, and x is 3 to 5, with a compound of the formula III $$R_1-NH-CO-NH-R_1 \quad (III)$$

in which each $R_1$ independently of the other is hydrogen or methyl, or
   (c) a mixture of a compound of the formula I with at least one compound of formulas II or III.

2. The process of claim 1, wherein the granulating auxiliary used is a eutectic mixture of at least two different compounds of the formula I, or a compound of the formula I with a compound of the formula II or III, or a mixture of a compound of the formula II with a compound of the formula III.

3. The process of claim 1, wherein the granulating auxiliary used is a compound of the formula I in which n is 20 to 150, and A, R and R' have the meanings defined in claim 1.

4. The process of claim 1, wherein the granulating auxiliary used is a compound of the formula I in which R is an aliphatic hydrocarbon radical containing 8 to 22 carbon atoms, and A, R' and n have the meanings defined in claim 1.

5. The process of claim 1, wherein the granulating auxiliary used is a compound of the formula I in which A is the group R—O—, R is straight-chain hydrocarbon radical containing 8 to 22 carbon atoms, and n is 35 to 80.

6. The process of claim 5, wherein the granulating auxiliary used is a compound of the formula I, in which A is the grop R—O—, R is an unsaturated hydrocarbon radical containing 18 carbon atoms, and n is 80.

7. The process of claim 5, wherein the granulating auxiliary used is a compound of the formula I, in which A is the group R—O—, R is a saturated hydrocarbon radical containing 18 carbon atoms, and n is 35.

8. The process of claim 1, wherein the granulating auxiliary used is a compound of the formula I, in which A is the group R—O—, and R is an alicyclic hydrocarbon radical containing 8 to 22 carbon atoms, and n has the meaning defined in claim 1.

9. The process of claim 8, wherein the granulating auxiliary used is a compound of the formula I, in which A is the group R—O—, R is an alicyclic hydrocarbon radical containing 8 to 22 carbon atoms, and n is 100.

10. The process of claim 9, wherein the granulating auxiliary used is hydroabietyl alcohol, etherified with 100 mols of ethylene oxide.

11. The process of claim 1, wherein the granulating auxiliary used is a compound of the formula I in which A is the group $$R'-\underset{\underset{O}{\|}}{C}-O-,$$

R' is an aliphatic straight-chain hydrocarbon radical containing 8 to 22 carbon atoms, and n is 10 to 30.

12. The process of claim 11, wherein the granulating auxiliary of the formula I used is the condensation product from oleic acid and 20 mols of ethylene oxide.

13. The process of claim 1, wherein the granulating auxiliary used is a mixture of a compound of the formula I, in which A is the group

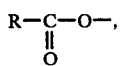

R' is an unsaturated, straight-chain hydrocarbon radical containing 8 to 22 carbon atoms, and n is 10 to 30, with urea, optionally in admixture with additives lowering the melting point.

14. The process of claim 13, wherein the granulating auxiliary used is a mixture of a condensation product of oleic acid and 20 mols of ethylene oxide with urea, optionally in admixture with additives lowering the melting point.

15. The process of claim 1, wherein the granulating auxiliary used is a mixture of a compound of the formula II, in which x is 3, and m has the meaning defined in claim 1, with urea, optionally in admixture with additives lowering the melting point.

16. The process of claim 1, wherein the granulating auxiliary used has a softening point or softening range of between 40° and 100° C.

17. The process of claim 1, wherein the granulating auxiliary is used in amounts of 10 to 30 percent by weight, relative to the dye.

18. The process of claim 1, wherein the further additives used are 0.1 to 50 percent by weight of diluting agents.

19. The process of claim 1, wherein water-soluble fibre reactive dyes are used.

20. The agglomerates produced by the process according to claim 1, which contain all together 5 to 50 percent by weight, relative to the dye, of at least one granulating auxiliary of the formula I, or of a mixture of at least two compounds of the formula I, II or III.

21. The dyeing of textile material from an aqueous dye liquor, employing the agglomerate obtained according to claim 20.

* * * * *